US006941626B2

(12) United States Patent
Johnson, Jr. et al.

(10) Patent No.: US 6,941,626 B2
(45) Date of Patent: Sep. 13, 2005

(54) TOOL FOR CONNECTING AND DISCONNECTING COUPLINGS

(76) Inventors: Ronald L. Johnson, Jr., 205 Meadow La., Midland, MI (US) 48640; John A. Luberda, 11432 Wilkinson Rd., Freeland, MI (US) 48623; Lee M. Fellows, 1410 W. Wackerly Rd., Sanford, MI (US) 48657

( * ) Notice: Subject to any disclaimer, the term of this patent is extended or adjusted under 35 U.S.C. 154(b) by 354 days.

(21) Appl. No.: 10/193,383

(22) Filed: Jul. 11, 2002

(65) Prior Publication Data

US 2004/0007094 A1 Jan. 15, 2004

(51) Int. Cl.[7] .................................................. B23P 19/00
(52) U.S. Cl. .......................................................... 29/237
(58) Field of Search .......................... 29/268, 237, 238, 29/282; 7/138, 125; 81/418, 421

(56) References Cited

U.S. PATENT DOCUMENTS 1,085,461 A 1/1914 Michaelis
1,402,391 A 1/1922 Baldus
1,406,331 A 2/1922 Bartelt
2,375,270 A 5/1945 Yonkers
4,718,317 A 1/1988 Hensler
4,738,017 A 4/1988 Teramo
5,226,231 A 7/1993 De Leebeeck
5,277,089 A 1/1994 McGushion
5,327,602 A * 7/1994 Stenger .......................... 7/125
5,537,727 A 7/1996 Mayer
5,671,520 A 9/1997 Scarborough
6,029,330 A 2/2000 Ratia
6,317,950 B1 11/2001 Irwin

* cited by examiner

*Primary Examiner*—Robert C. Watson
(74) *Attorney, Agent, or Firm*—Ian C. McLeod

(57) ABSTRACT

A tool for connecting and disconnecting a coupling having a combination of pliers and a wrench. The pliers have a first jaw with extensions which are positioned over the yokes of the first part of the coupling and a second jaw for positioning adjacent the second part of the coupling. The wrench has a third jaw which is slidably attached to the second jaw. The third jaw has extensions which are positioned around the yokes of the second part of the coupling. The pliers of the tool are used to compress the first and second parts of the coupling together. The wrench is used to rotate the second part of the coupling to disconnect or connect the coupling.

16 Claims, 9 Drawing Sheets

TOOL FOR CONNECTING AND DISCONNECTING COUPLINGS

STATEMENT REGARDING FEDERALLY SPONSORED RESEARCH OR DEVELOPMENT

Not Applicable

CROSS-REFERENCES TO RELATED APPLICATIONS

Not Applicable

BACKGROUND OF THE INVENTION (1) Field of the Invention

The present invention relates to a tool for connecting and disconnecting a pneumatic coupling. In particular, the present invention relates to a tool for connecting and disconnecting a pneumatic coupling which includes a combination of pliers and a wrench to provide both compression and rotation of the coupling.

(2) Description of the Related Art

The related art has shown various types of tools used for connecting and disconnecting parts of joints, fittings and couplings. Illustrative are U.S. Pat. No. 4,738,017 to Teramo; U.S. Pat. No. 5,226,231 to De Leebeeck; and U.S. Pat. No. 5,671,520 to Scarborough.

Teramo shows a tool for removing an automotive parking brake cable and lever which includes a prying device secured to one of the handle members of a locking pliers. The prying device is not able to rotate separate from the pliers.

De Leebeeck describes a tool for joining plastic pipe and fittings. The tool allows for moving the pipe section longitudinally into the fitting while rotating the fitting axially a quarter turn. The tool uses a fitting engaging assembly for grasping the pipe and a pipe engaging assembly for mounting on the pipe. The pipe engaging assembly has inner and outer rings. The outer ring rotates with the fitting engaging assembly and the fitting while the inner ring and pipe remain stationary. To use the device, the fitting engaging assembly is mounted around the fitting and the pipe engaging assembly is mounted around the pipe. An activator means is used to connect the fitting engaging assembly to the pipe engaging assembly. A handle attached to the fitting engaging assembly is rotated about the axis of the fitting while simultaneously moved rearward thereby rotating the fitting and pulling the pipe into the fitting.

Scarborough shows a tool for disconnecting conduit fittings for vehicular sub-systems. The tool includes pliers having first and second jaws and a third handle pivotably attached to the first and second handles of the pliers. The first and second jaws are used to compress the female connector part to release the spring while the third jaw is used for holding the connecter flange and to move the male connector part away from the female connector part after the spring is released.

Also of interest are U.S. Pat. No. 1,402,391 to Baldus; U.S. Pat. No. 1,406,331 to Bartelt; U.S. Pat. No. 2,375,270 to Yonkers; U.S. Pat. No. 4,718,317 to Hensler; U.S. Pat. No. 5,227,089 to McGushion; and U.S. Pat. No. 6,317,950 BI to Irwin.

Baldus shows a combination tool having both pliers and a wrench. The pliers are used to hold the pipe while the wrench is used to hold the upper nut. A second tool is then used to rotate the lower nut. In this combination tool, both the pliers and the wrench are used to prevent axial rotation. The pliers are not used to compress the valve. Further in this invention, a second tool is needed to rotate the nut to connect or disconnect the valve.

Bartelt shows a tool having a pair of spaced apart wrenches for adjusting a tappet valve. The wrenches hold the tappet member and the adjusting screw while a second tool is used to rotate the lock-nut to secure the parts in the adjusted position.

Yonkers describes a tool for connecting or disconnecting a clamping head of a tap connector for use on transmission line wire. The tool includes a primary wrench and a socket wrench. The primary wrench is used to hold the clamp head while the socket wrench rotates the nut.

Hensler describes a hose coupling wrench apparatus which includes two spaced apart movable wrench members. Each wrench member is used to engage a hose coupling section. One wrench member can be moved relative to the other wrench member to couple or uncouple the hose coupling.

McGushion shows pliers for compressing a union and preventing rotation of the union a second tool is used to rotate the nut to connect or disconnect the union.

Irwin shows a pipe crimping tool. The tool includes a holding device with a pair of crimping arms pivotably mounted on the holding device.

Further U.S. Pat. No. 1,085,461 to Michaelis and U.S. Pat. No. 5,537,727 to Mayer show pliers for making and releasing the connection between joint members or connectors.

Only of minimal interest are U.S. Pat. No. 6,029,330 to Ratia, Jr. which shows a tool having locking pliers and used to remove a heat sink and U.S. Pat. No. 5,327,602 to Stenger which shows a combination tool having a wrench and pliers. However, in this tool, the wrench and pliers are not intended to be used simultaneously.

There remains the need for a tool for connecting or disconnecting a coupling which uses a combination of pliers to compress the coupling and a wrench to rotate one part of the coupling.

SUMMARY OF THE INVENTION

The present invention relates to a tool for connecting and disconnecting a pneumatic coupling. The tool includes a combination of pliers and a wrench. The pliers include a first member and a second member which are connected together to form pliers. The pliers can be locking pliers. The first member has a first jaw for positioning around the first part of the coupling. For a single coupling, the first jaw has an arcuate opening for positioning the first jaw adjacent the body of the first part of the coupling. The first jaw also has extensions which are positioned over the yokes of the first part of the coupling. The extensions help to guide the first jaw into position on the first part. For a Y-shaped coupling, the first jaw has a groove which contacts the body of the first part between connection points opposite the coupling connection. The second member has a second jaw. The second jaw has an arcuate opening which allows the second jaw to be positioned adjacent the second end of the body of the second part. The wrench includes a third member having a handle portion and a third jaw. The third jaw is slidably attached to the second jaw on a side adjacent the first jaw. The third jaw has an arcuate opening and is positioned on the second jaw such that the center of the opening of the second jaw is aligned with the center of the opening of the third jaw. The third jaw has extensions on a side opposite the second jaw. The extensions are positioned around the yokes of the second part of the coupling. The pliers of the tool are used to compress the first and second parts of the coupling together. The wrench is then used to rotate the second part of the coupling to disconnect or connect the coupling.

The present invention relates to a tool for separating a first part of a pneumatic coupling from a second part of the pneumatic coupling, each of the first and second parts having a center bore which define a longitudinal axis when the first and second parts are connected together, the tool which comprises a first member having a jaw end and a handle end; a first jaw mounted on the jaw end of the first member and configured to engage the first part of the pneumatic coupling; a second member having a jaw end and a handle end and pivotably connected to the first member to form pliers; a second jaw mounted on the jaw end of the second member; and a third member having a handle end and a jaw end with a third jaw mounted on the jaw end and slidably connected to the second jaw for arcuate movement about the longitudinal axis, the third jaw configured to engage the second part of the pneumatic coupling and wherein, when the first member and the second member are moved into a closed position, the first and second parts of the coupling are moved toward each other and are connected or disconnected by rotation of the third jaw by the handle end of the third member.

Further, the present invention relates to a combination tool for separating a first part of a pneumatic coupling from a second part of a pneumatic coupling each part having a center bore which define a longitudinal axis when the first part and the second part are connected together, which comprises pliers having a first member with a first jaw and a second member pivotably connected to the first member and having a second jaw, wherein the first jaw is configured to engage the first part of the coupling and wherein when the pliers are moved to a closed position, the first and second jaws move the first part and second part of the coupling toward each other; and a wrench having a handle and a third jaw and connected to the second member, wherein the third jaw is configured to engage the second part of the coupling to rotate the second part of the coupling about the longitudinal axis.

Still further, the present invention relates to a method for connecting or disconnecting a pneumatic coupling which comprises the steps of providing the pneumatic coupling having a first part connected to a second part and having a longitudinal axis; providing a tool having a first member having a jaw end and a handle end; a first jaw mounted on the jaw end of the first member and configured to engage the first part of the pneumatic coupling; a second member having a jaw end and a handle end and pivotably connected to the first member to form pliers; a second jaw mounted on the jaw end of the second member; a third jaw having a handle and slidably connected to the second jaw and configured to engage the second part of the pneumatic coupling; positioning the tool in an open position around the coupling such that the first jaw engages the first part of the coupling and the third jaw engages the second part of the coupling; moving the handle end of the first member and the handle end of the second member to a closed position such that the first jaw and the second jaw move toward each other to move the first part of the coupling and the second part of the coupling toward each other; moving the handle of the third jaw to move the third jaw which rotates the second part of the coupling; moving the handle end of the first member and the handle end of the second member into the position; and removing the tool from around the coupling.

The substance and advantages of the present invention will become increasingly apparent by reference to the following drawings and the description.

BRIEF DESCRIPTION OF THE DRAWING(S)

Figure 6:
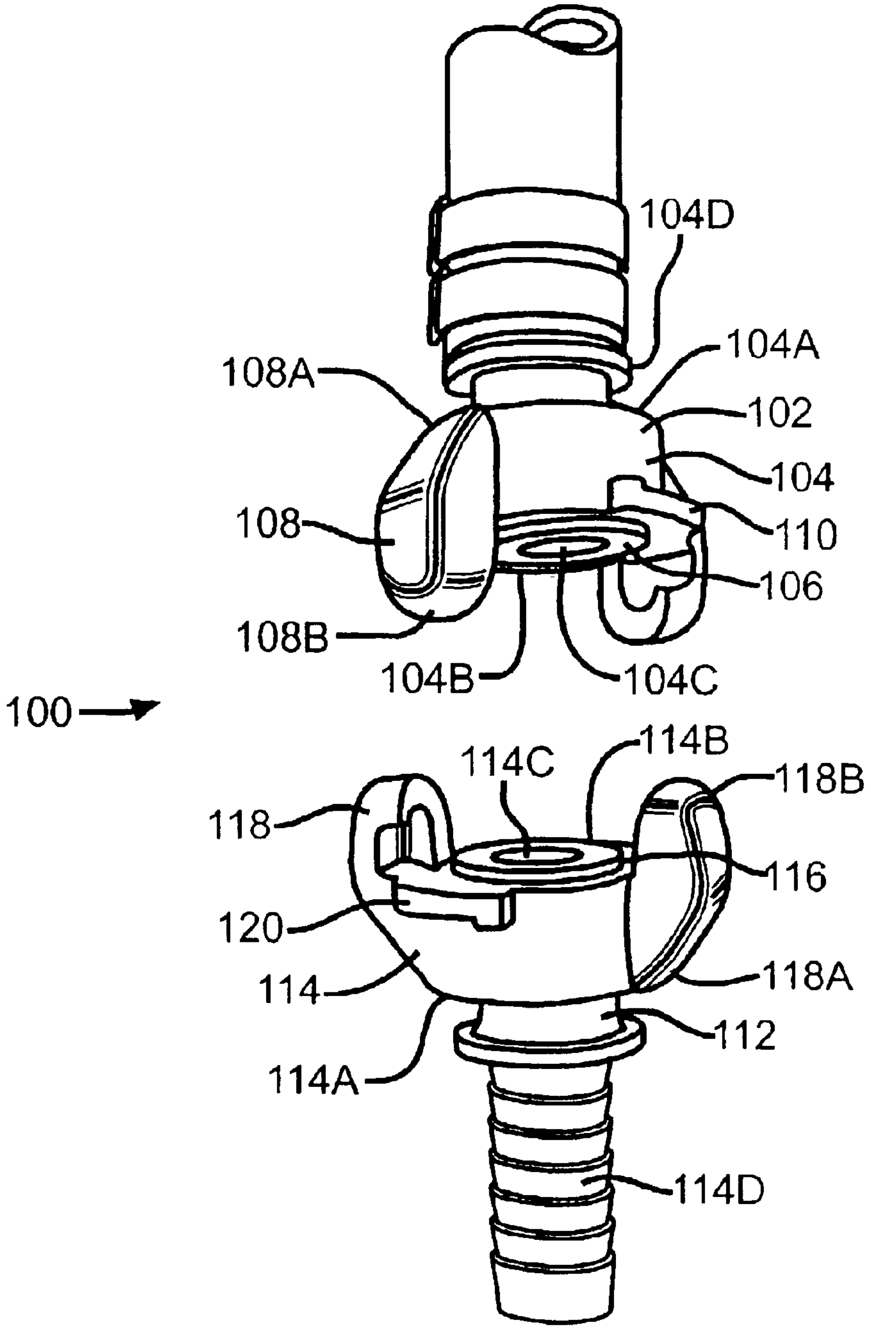

FIG. 6 is a perspective view of the universal coupling 100 in the disconnect position showing the first part 102 and the second part 112.

Figure 3:
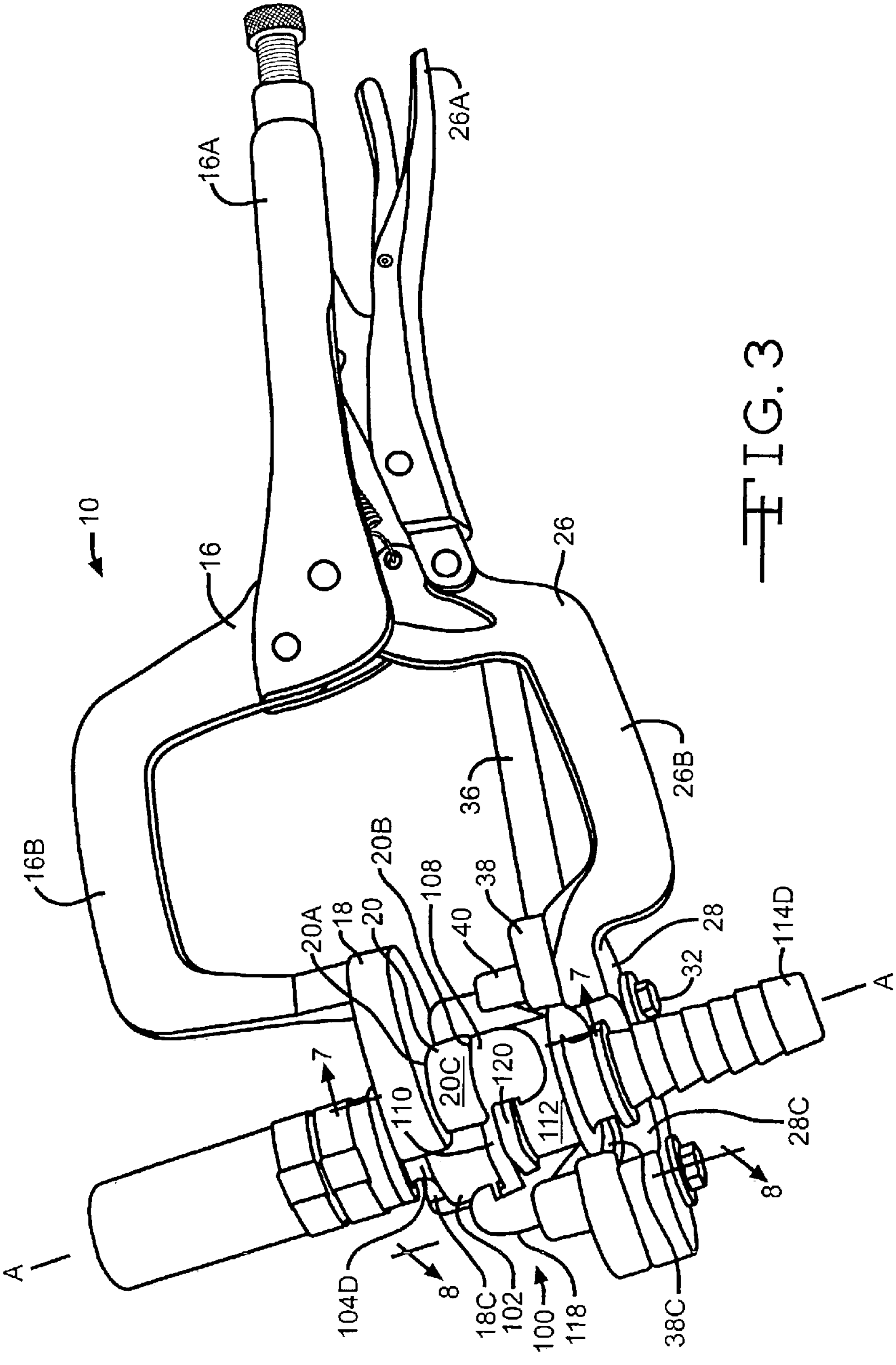
FIG. 3 is a right side view of the tool 10 with the pliers 12 in the closed, locked position.
Figure 7:
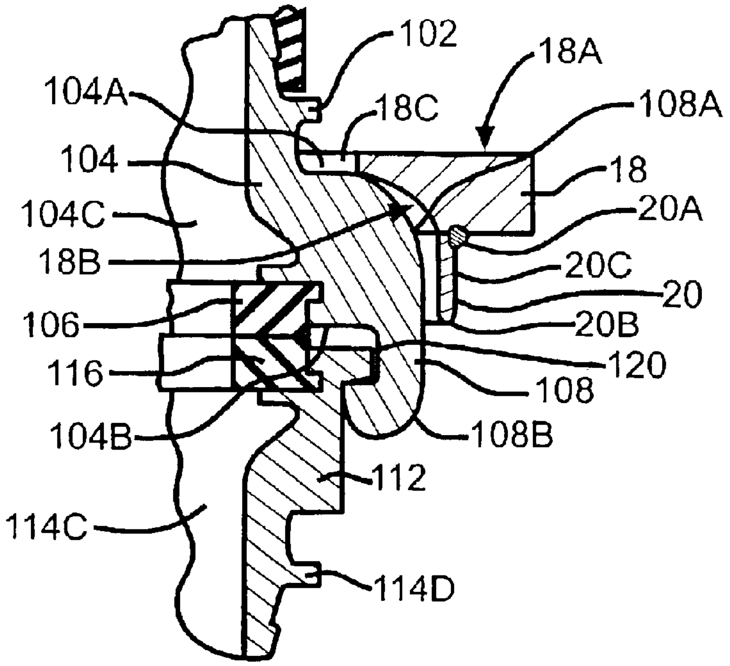

FIG. 7 is a cross-sectional view along the line 7—7 of FIG. 3 showing the first jaw 18 positioned around the first part 102 of the coupling 100.

Figure 8:
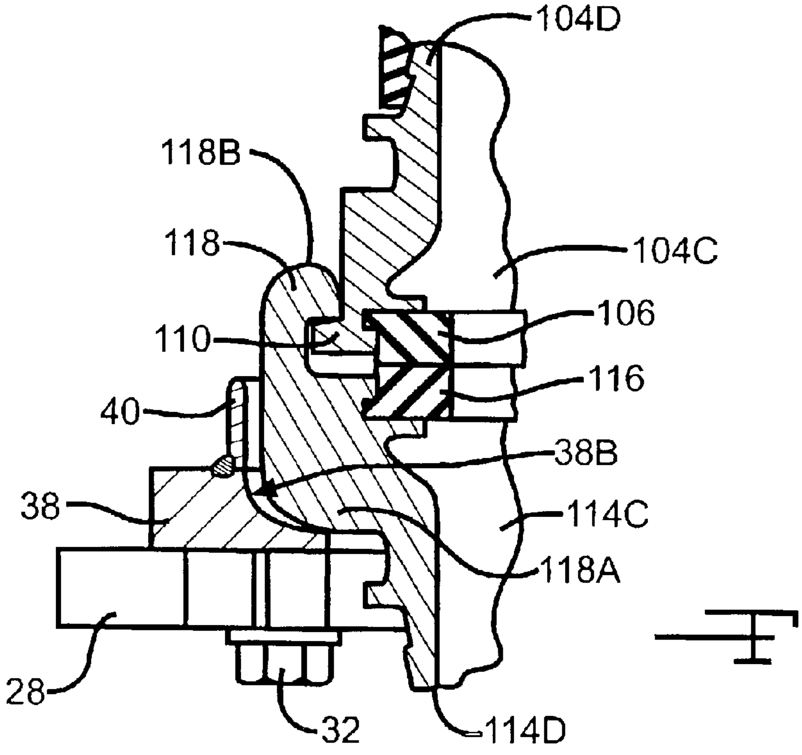

FIG. 8 is a cross-sectional view along the line 8—8 of FIG. 3 showing the second jaw 28 and third jaw 38 positioned around the second part 112 of the coupling 100.

Figure 9:
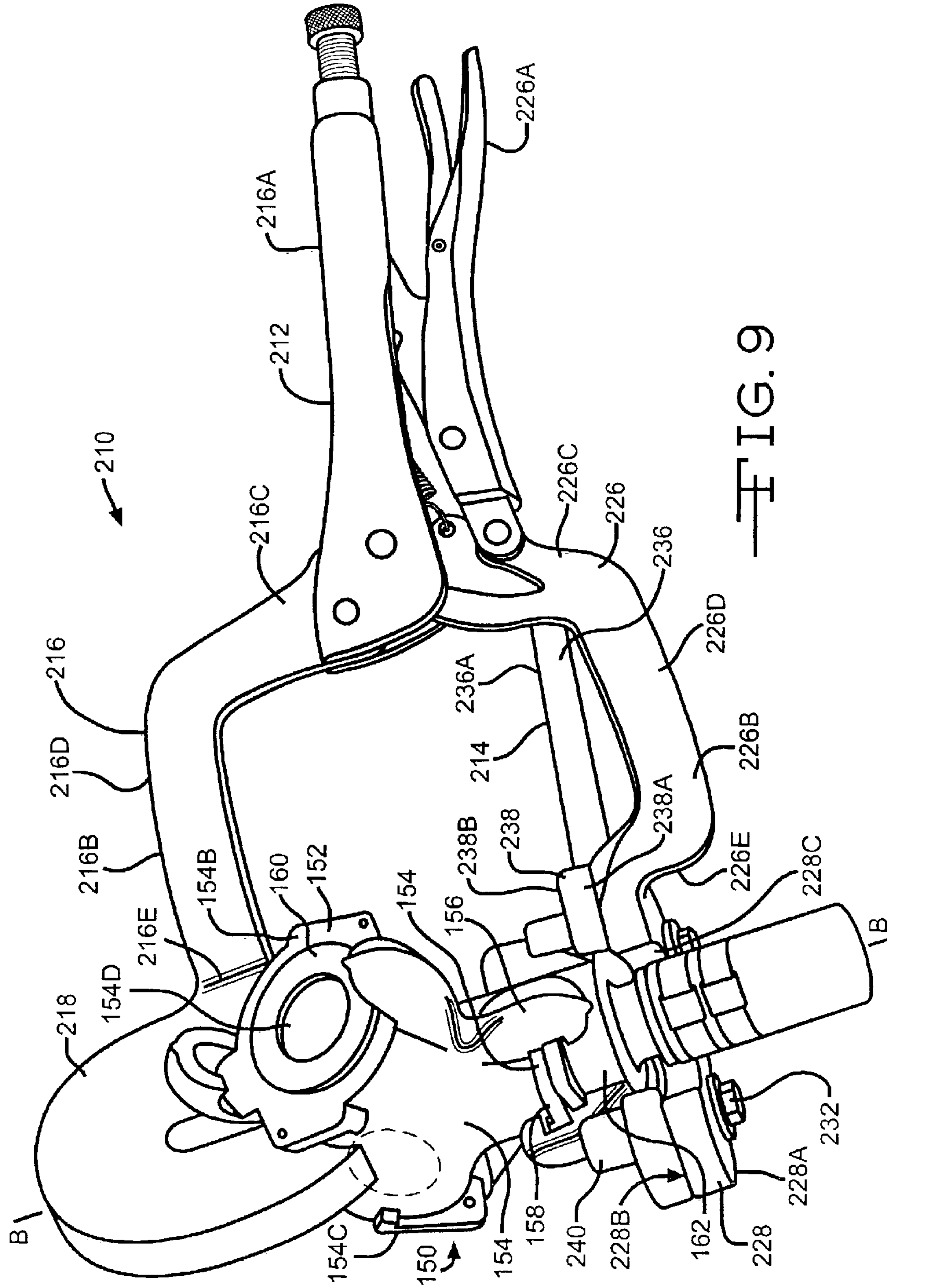

FIG. 9 is a perspective view of the tool 210 of the second embodiment showing the pliers 212 in the closed position.

Figure 10:
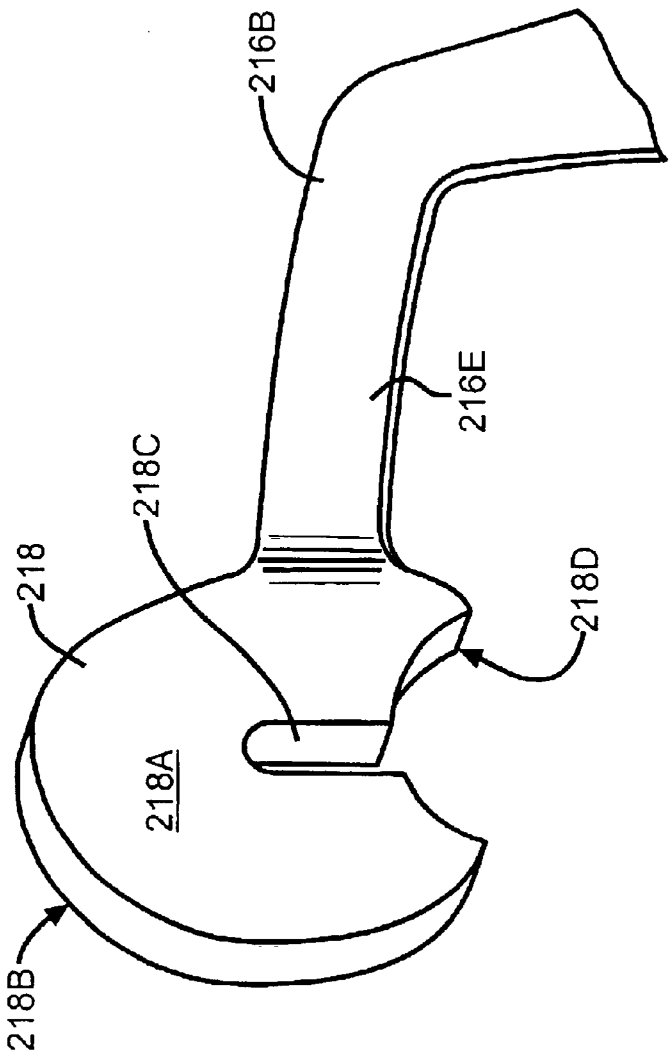

FIG. 10 is a partial perspective view of the first jaw 218 of the tool 210 of the second embodiment.

DESCRIPTION OF THE PREFERRED EMBODIMENT(S)

FIGS. 1 to 5 and 9 show the tool 10 and 210 of the present invention. The tool 10 and 210 is intended to be used to connect and disconnect a pneumatic universal coupling 100 and 150, also known as a Chicago type coupling (FIG. 6). The coupling 100 and 150 includes a first part 102 and 152 and a second part 112 and 162. In the first embodiment, the coupling 100 is a single coupling for connecting two (2) pneumatic hoses together. In the first embodiment, the first part 102 and the second part 112 of the coupling 100 are identical. The first and second parts 102 and 112 of the coupling 100 include a body 104 and 114 having an essentially cylindrical shape with first and second ends 104A, 104B, 114A and 114B and a center bore 104C and 114C extending between the ends 104A, 104B, 114A and 114B. A barbed connecter 104D and 114D is provided on the first end 104A or 114A of the body 104 or 114 aligned with the center bore 104C or 114C to allow for connecting a pneumatic hose to the part 102 or 112. A bushing 106 or 116 is provided on the second end 104B or 114B of the body 104 or 114 and extends into the opening of the center bore 104C or 114C. The bushing 106 or 116 is preferably constructed of a flexible material such as rubber. A pair of yokes 108 and 118 are located on the outer surface of the body 104 and 114. The first ends 108A and 118A of the yokes 108 and 118 angle outward from adjacent the first end 104A and 114A of the body 104 and 114. The second ends 108B and 118B of the yokes 108 and 118 extend outward beyond the second end 104B and 114B of the body 104 and 114. Flanges 110 and 120 are provided on the outer surface of the body 104 and 114 adjacent the second end 104B and 114B of the body 104 and 114. One (1) flange 110 and 120 is provided adjacent each of the yokes 108 and 118. The second ends 108B and 118B of the yokes 108 and 118 have channels which slide over the flanges 110 and 120 on the opposite part 102 or 112 of the coupling 100 to hold the first and second parts 102 and

112 of the coupling 100 together. When the first and second parts 102 and 112 are connected together, the center bores 104C and 114C of the first and second parts 102 and 112 are aligned and the axis of the center bores 104C and 114C forms a longitudinal axis A—A. In the second embodiment, the coupling 150 is a universal Y-shaped coupling which allows for connecting three pneumatic hoses together (FIG. 9). The first part 152 of the Y-shaped coupling has an essentially Y-shaped body 154 with three (3) connection points 154A, 154B and 154C. The connection points 154A, 154B, and 154C are separated by approximately 120°. The connection points 154A, 154B and 154C include yokes 156 and flanges 158 similar to the first and second parts 102 and 112 of the coupling 100 of the first embodiment. The connection points 154A, 154B and 154C also have center bores 154D with bushings 160. The second part 162 of the Y-shaped coupling 150 is essentially identical to the first or second parts 102 and 112 of the coupling 100 of the first embodiment and has a center bore (not shown). When the coupling 150 is connected, the center bore 154D of the connector point 154A and the center bore of the second part 162 of the Y-shaped coupling 150 form longitudinal axis B—B.

The tool 10 and 210 includes a combination of pliers 12 and 212 and a wrench 14 and 214 which enables a single tool to be used to connect or disconnect a coupling 100 or 150. The pliers 12 and 212 include a first member 16 and 216 and a second member 26 and 226 pivotably connected together to form the pliers 12 and 212. In one (1) embodiment, the pliers 12 or 212 are locking-grip or locking pliers which are also known as vice grips. The first and second members 16, 216, 26 and 226 have a handle portion or end 16A, 216A, 26A and 226A and a jaw portion or end 16B, 216B, 26B and 226B. The handle portions 16A, 216A, 26A and 226A are similar to the handle of pliers or locking pliers well known in the art. The jaw portion 16B and 216B of the first member 16 or 216 has a U-shape with a first section 16C and 216C, a second section 16D and 216D and a third section 16E and 216E. One end of the first section 16C and 216C is connected to the handle portion 16A and 216A. The first section 16C and 216C extends away from the handle portion 16A and 216A essentially perpendicular to the handle portion 16A and 216A in a direction opposite the second member 26 and 226. The second section 16D and 216D extends outward from the end of the first section 16C and 216C opposite the handle portion 16A and 216A. The second section 16D and 216D extends essentially perpendicular to the first section 16C and 216C in a direction opposite the handle portion 16A and 216A. The third section 16E and 216E extends outward perpendicular to the second section 16D and 216D toward the second member 26 and 226. The first jaw 18 and 218 is mounted on the end of the third section 16E and 216E opposite the second section 16D and 216D. The jaw portion 26B and 226B of the second member 26 and 226 also has a U-shape with a first, second and third section 26C, 226C, 26D, 226D, 26E and 226E with the first section 26C and 226C connected to the handle portion 26A and 226A and the second jaw 28 and 228 mounted on the third section 26E and 226E. The shape of the jaw portions 16B, 216B, 26B and 226B of the first and second members 16, 216, 26, and 226 allows the first and second jaws 18, 218, 28 and 228 to be spaced apart a distance when the pliers 12 and 212 are in the unlocked, open position. This enables the first and second jaws 18, 218, 28 and 228 to be easily positioned around the first and second parts 102, 152, 112 and 162 of the coupling 100 and 102. In the first embodiment, the shape of the jaw portions 16B and 26B of the first and second members 16 and 226 allows the first and second jaws 18 and 28 to be parallel when the pliers 12 are in the closed position.

In the first embodiment, the first jaw 18 has an essentially semi-circular shape with a first side 18A and a second side 18B with an arcuate or curved opening 18C between the sides 18A and 18B with an entrance 18D to the opening 18C along one edge of the first jaw 18. The first jaw 18 is mounted on the first side 18A to the third section 16E of the jaw portion 16B of the first member 16 opposite the handle portion 16A of the first member 16. In one (1) embodiment, the first jaw 18 is connected to the first member 16 at a point opposite the entrance 18D to the arcuate opening 18C. It is understood that the first jaw 18 and the first member 16 could be constructed as a unitary piece. The arcuate opening 18C of the first jaw 18 has a shape similar to the shape of the body 104 of the first part 102 of the coupling 100. The opening 18C has a size slightly greater than the outer diameter of the cylindrical body 104 of the first part 102 of the coupling 100. The size and shape of the opening 18C allows the first jaw 18 to be easily positioned over the first part 102 of the coupling 100. Extensions or guides 20 are mounted on the second side 18B of the first jaw 18. In one (1) embodiment, the first jaw 18 has two (2) extensions 20, one (1) adjacent each side of the entrance 18D of the arcuate opening 18C. The extensions 20 are positioned such as to be spaced approximately 180° apart about the center of the opening 18C. The extensions 20 have a first end 20A and a second end 20B with a curved sidewall 20C extending therebetween. The curved sidewall 20C has an arcuate inside surface. The first ends 20A of the extensions 20 are mounted on the second side 18B of the first jaw 18. The length of the extensions 20 between the ends 20A and 20*b* and the shape of the inside surface of the extensions 20 depend on the shape of the yokes 108 of the first part 102 of the coupling 100. In one (1) embodiment, the inside surface is semi-circular. In one (1) embodiment, a portion of the second side 18B of the first jaw 18 within the extension 20 is rounded and indented to allow better contact between the first jaw 18 and the first end 108A of the yokes 108 of the first part 102 of the coupling 100. The first jaw 18 and extensions 20 engage and secure the first part 102 of the coupling 100 to prevent movement of the first part 102 of the coupling 100 when the second part 112 is rotated to connect or disconnect the coupling 100.

The second jaw 28 has first side 28A and a second side 28B with an arcuate opening 28C extending through the sides 28A and 28B with an entrance 28D to the opening 28C along one edge of the second jaw 28. In one (1) embodiment, the size and shape of the second jaw 28 is similar to the size and shape of the first jaw 18 and the opening 28C of the second jaw 28 is similar in size and shape to the opening 18C of the first jaw 18. The second jaw 28 is mounted on the third section 26E of the jaw portion 26B of the second member 26. The jaw portion 26B is mounted to the edge of the second jaw 28 adjacent the entrance 28D of the opening 28C. It is understood that the second member 26 and the second jaw 28 could be constructed as a unitary piece. The second jaw 28 is provided with curved slots 30 which allow for slidably connecting the third jaw 38 to the second jaw 28. The first and second jaws 18 and 28 are mounted on the first and second members 16 and 26 such that when the pliers 12 are in the closed position, the centers of the openings 18C and 28C of the first and second jaws 18 and 28 are aligned and the entrances 18D and 28D to the openings 18C and 28C are offset approximately 90°.

The wrench 14 is formed by the third member 36 which has a handle portion or end 36A and a jaw portion or end 36B. The jaw portion 36B forms the third jaw 38. The third jaw 38 has a first side 38A and a second side 38B with an arcuate opening 38C extending between the sides 38A and 38B with an entrance 38D to the opening 38C along an edge of the third jaw 38. In one (1) embodiment, the third jaw 38 is similar in shape and size to the first and second jaws 18 and 28. The curved opening 38C of the third jaw 38, in one (1) embodiment, is similar in shape and size to the curved openings 18C and 28C of the first and second jaws 18 and 28. The handle portion 36A of the third member 36 is mounted to the edge of the third jaw 38 spaced apart from the entrance 38D of the arcuate opening 38C. The third jaw 38 is slidably connected to the second jaw 28 by pins or rods 32 which extend through the third jaw 38 and into the curved slots 30 in the second jaw 28. The length of the slots 30 is such that the third jaw 38 rotates about the center of the openings 28C and 38C between approximately 30° and 40°. The third jaw 38 is mounted on the second jaw 28 such that the first side 38A of the third jaw 38 is adjacent the second side 28B of the second jaw 28 and the center of the opening 38C of the third jaw 38 is aligned with the center of the opening 28C of the second jaw 28. The handle portion 36A of the third member 36, in one (1) embodiment, is formed by a cylindrical rod. The handle portion 36A is mounted on the edge of the third jaw 38 such that in the disconnect position, the handle portion 36A of the third member 36 is adjacent the handle portions 16A and 26A of the first and second members 16 and 26. The third jaw 38 is provided with extensions or guides 40 on the second side 38B adjacent the ends of the entrance 38D of the arcuate opening 38C. The extensions 40 are preferably similar in shape and size to the extensions 20 of the first jaw 18.

FIG. 9 shows a second embodiment of the coupling tool 210. In this embodiment, the coupling 150 is a universal Y-shaped coupling. The second and third jaws 228 and 238 of the second embodiment are similar to the second and third jaws 28 and 38 of the first embodiment. The first jaw 218 of the second embodiment is constructed to allow for mounting between two (2) adjacent connection points 154B and 154C of the first part 152 of the coupling 150, opposite the connection point 154A to be used. The first jaw 218 has a first side 218A and a second side 218B with a groove 218C between the sides 218A and 218B with an entrance 218D to the groove 218C along the edge of the first jaw 218 (FIG. 10). The entrance 218D of the groove 218C is enlarged to enable the groove 218C to fit over the body 154 of the coupling 150. The first jaw 218 and groove 218C engage and secure the first part 152 of the Y-shaped coupling 150 to prevent movement of the first part 152 of the coupling 150 when the second part 162 is rotated to connect and disconnect the coupling 150. The third section 216E of the jaw portion 216B of the first member 216 is mounted on the edge of the first jaw 218. The first jaw 218 is mounted on the first member 216 such that the plane formed by the first and second sides 218A and 218B of the first jaw 218 is perpendicular to the plane formed by the first and second sides 228A and 228B of the second jaw 228 when the pliers 212 are in the closed position. In this position, the groove 218C extends essentially along the longitudinal axis B—B and the first jaw 218 acts to secure the first part 152 of the coupling 150 in a fixed position.

Figure 1:
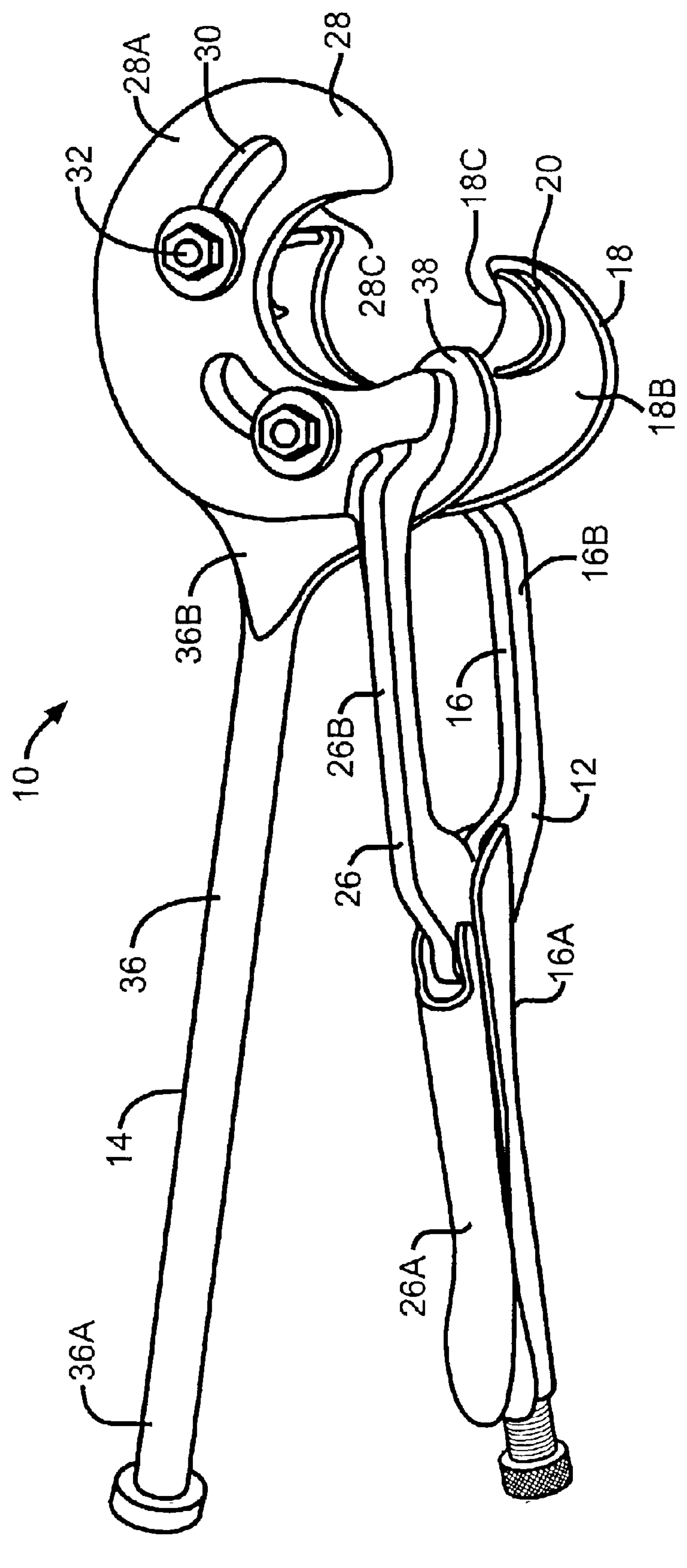
FIG. 1 is a bottom view of the tool 10.
Figure 2:
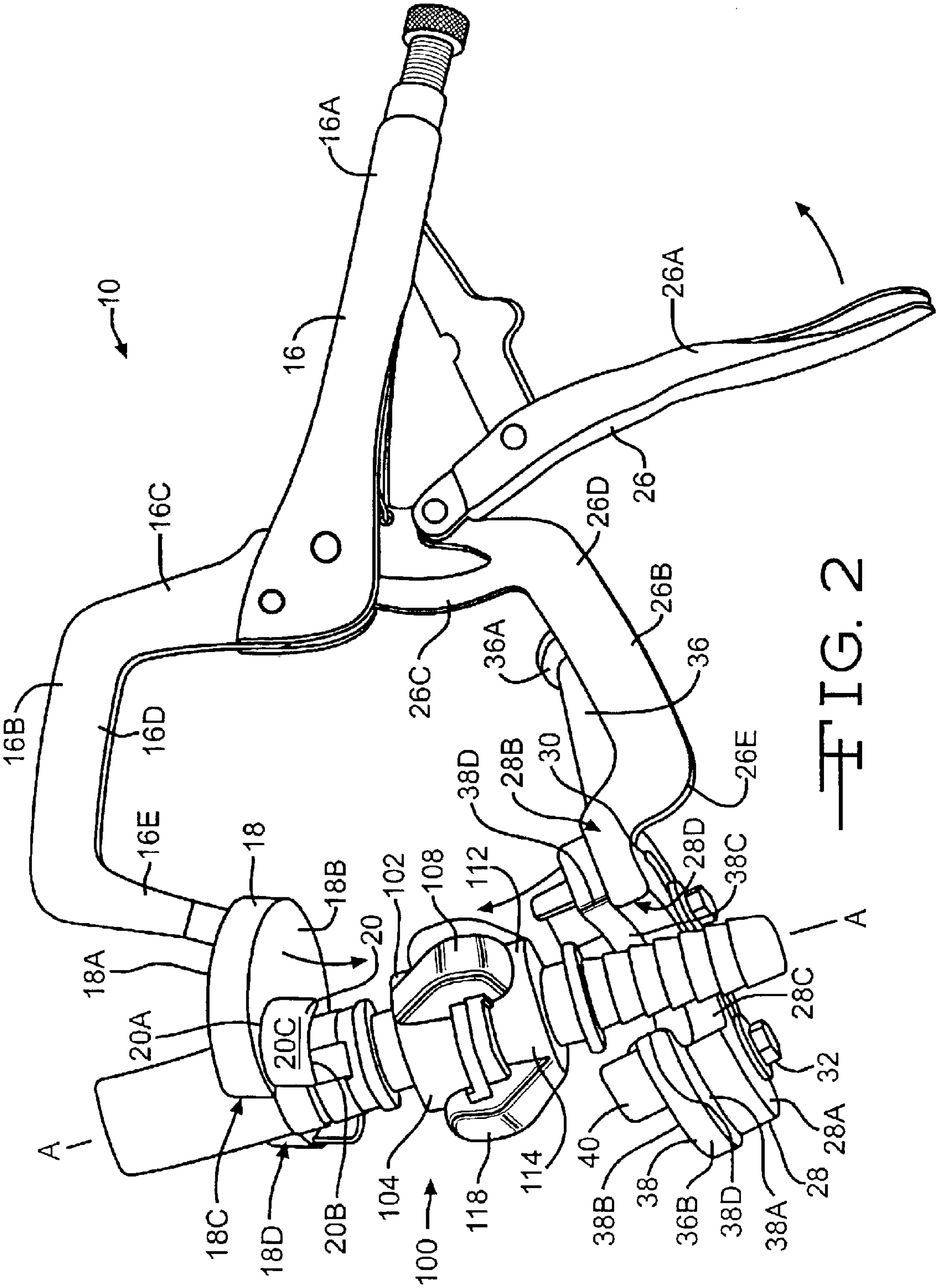
FIG. 2 is a right side view of the tool 10 with the pliers 12 in the open, unlocked position.

To use the tool 10 or 210 to disconnect a coupling 100 or 150, the jaws 18, 28, 38, 218, 228 and 238 of the tool 10 and 210 are first positioned around the first and second parts 102, 112, 152 and 162 of the coupling 100 and 150. To position the jaws 18, 28, 38, 218, 228 and 238 around the coupling 100 and 150, the pliers 12 and 212 are in the open position and the wrench 14 and 214 is in the connect position (FIG. 2). In the connect position, the handle portion 36A and 236A of the third member 36 and 236 is spaced apart from the handle portions 16A, 26A, 216A and 226A of the first and second members 16, 26, 216 and 226 and the extensions 40 and 240 of the third jaw 38 and 238 are spaced between the extensions 20 and 220 of the first jaw 18 and 218 such that each extension 20, 220, 40 and 240 is spaced apart about the longitudinal axis A—A. In one (1) embodiment, the extensions 20, 220, 40 and 240 are spaced apart approximately 90° about the longitudinal axis A—A. In one (1) embodiment where the coupling 100 is a universal Chicago type coupling, and the tool 10 and 210 is positioned with the first member 16 and 216 above the second member 26 and 226, the third member 36 and 236 is in the connect position when the pins 32 and 232 are adjacent one end of the slots 30 such that the third jaw 38 and 238 is rotated fully in the counterclockwise direction about the longitudinal axis A—A (FIG. 1).

In the first embodiment, to disconnect the coupling 100, the first jaw 18 is first positioned adjacent the first part 102 of the coupling 100. The first jaw 18 is positioned adjacent the first part 102 of the coupling 100 such that the second side 18B of the first jaw 18 is adjacent the first end 104A of the body 104 and the extensions 20 of the first jaw 18 surround the first ends 108A of the yokes 108 of the first part 102. In one (1) embodiment, the extensions 20 have a size greater than the size of the yokes 108 such that the extensions 20 are easily positioned over the yokes 108 (FIG. 7). Next, the second jaw 28 is positioned adjacent the first end 114A of the body 114 of the second part 112 of the coupling 100 such that the barbed connecter 114D of the second part 112 is located within the opening 28C of the second jaw 28. The third jaw 38 is positioned on the second part 112 similarly to the positioning of the first jaw 18 on the first part 102. The second side 38B of the third jaw 38 is adjacent the first end 114A of the body 114 of the second part 112 and the extensions 40 extend upward around the first ends 118A of the yokes 118 of the second part 112. In one (1) embodiment, the size of the extensions 40 is greater than the size of the yokes 118 such that the extensions 40 are easily positioned around the yokes 118 (FIG. 8). Once in position, the pliers 12 are moved into the closed position. As the pliers 12 move into the closed position, the first jaw 18 moves toward the second jaw 28. As the first jaw 18 moves, the portions of the second side 18B of the first jaw 18 within the extensions 20 contact the first ends 108A of the yokes 108 of the first part 102 of the coupling 100 and move the first part 102 towards the second part 112 (FIG. 7). Similarly, the second jaw 28 moves toward the first jaw 18 which moves the portions of the second side 38B of the third jaw 38 within the extensions 40 into contact with the first ends 118A of the yokes 118 of the second part 112 (FIG. 8). As the first and second parts 102 and 112 of the coupling 100 are moved together, the bushings 106 and 116 of each part 102 and 112 are compressed. In one (1) embodiment, the first and second parts 102 and 112 are moved together until the bushings 106 and 116 are fully compressed. In the closed position, the first jaw 18 is parallel to the second and third jaws 28 and 38 and the openings 18C, 28C and 38C of the first, second and third jaws 18, 28 and 38 are centered and aligned along the longitudinal axis A—A (FIG. 3). In one (1) embodiment, where the pliers 12 are adjustable locking pliers, the pliers 12 are locked in the closed position. In this embodiment, the user does not need to continue to hold the first and second members 16 and 26 together while rotating the wrench 14. Once the pliers 12 are in the closed position, the third jaw

Figure 4:
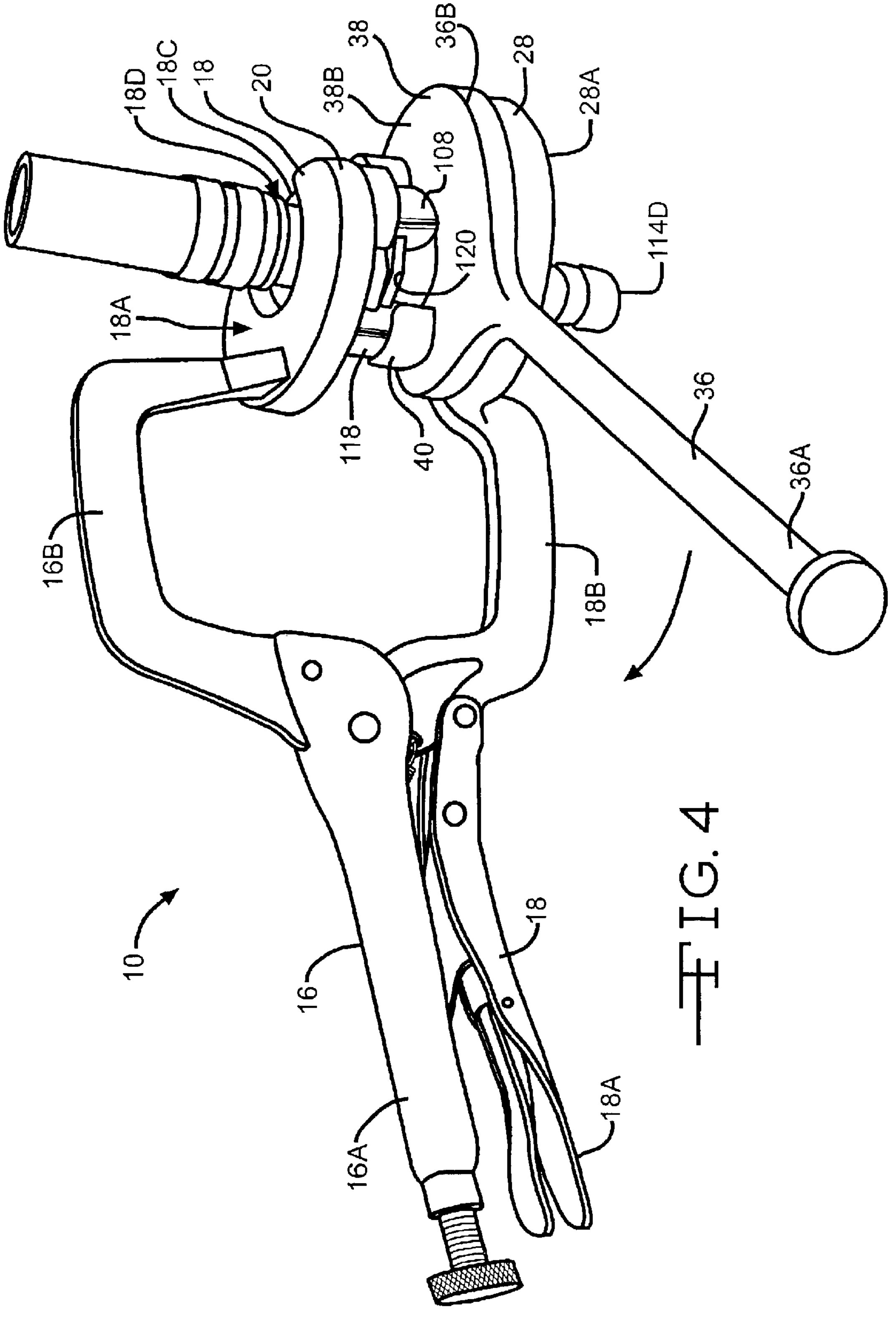
FIG. 4 is a left side view of the tool 10 showing the third member 36 in the connect position.
Figure 5:
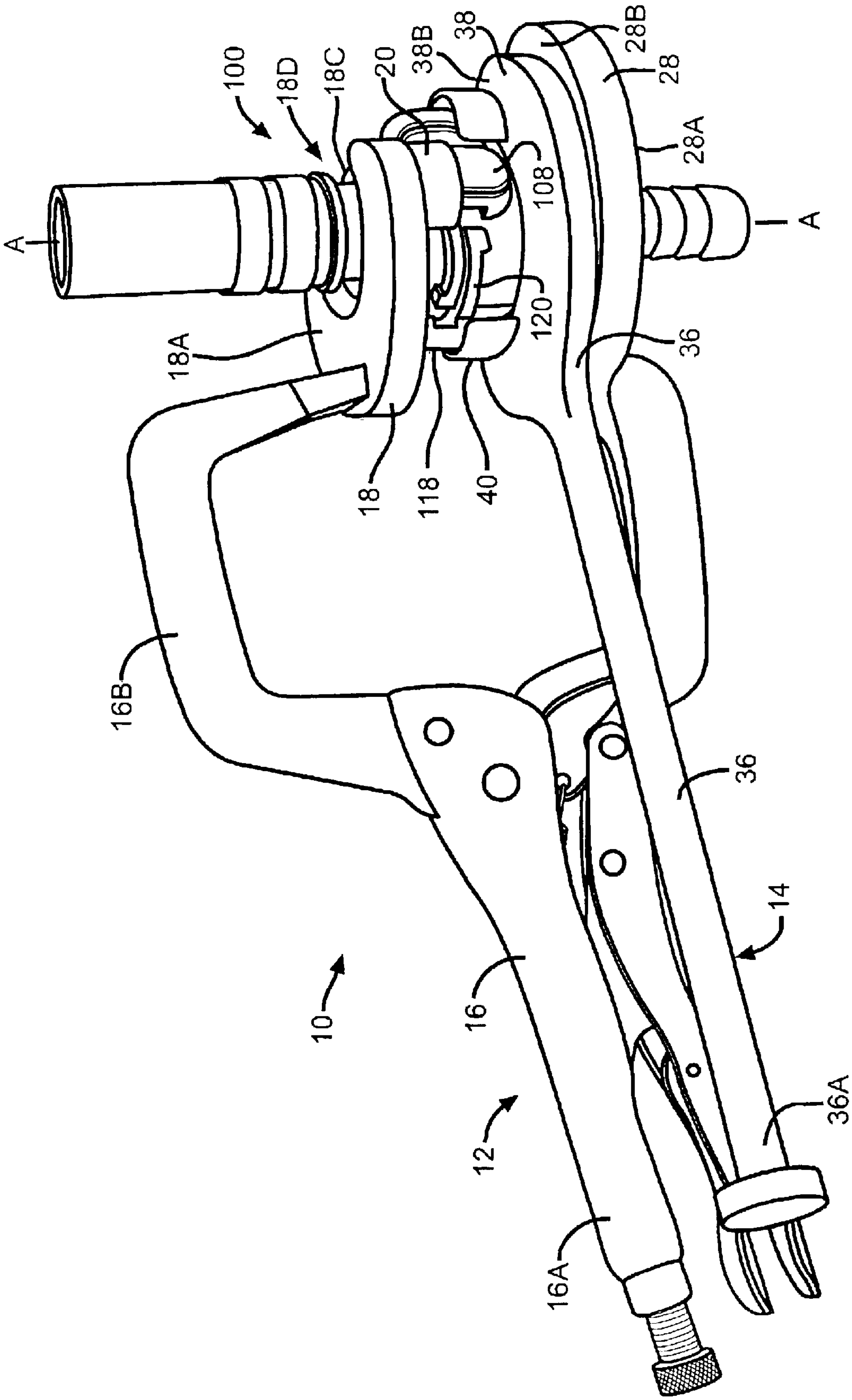
FIG. 5 is a left side view of the tool 10 showing the third member 36 in the disconnect position.

38 is rotated around the longitudinal axis A—A in the clockwise direction to the disconnect position when the tool 10 is positioned with the first jaw 18 above the second jaw 28 (FIG. 4). It is understood that the direction of rotation of the third jaw 38 and the second part 112 of the coupling 100 depends on the position of the coupling 100 and the type of coupling. To rotate the third jaw 38, the handle portion 36A of the third member 36 is moved toward the handle portions 16A and 26A of the first and second members 16 and 26. Increasing the length of the handle portion 36A of the third member 36 increases the rotational leverage applied to the second part 112 of the coupling 100. As the third jaw 38 rotates, the extensions 20 of the first jaw 18 engage the yokes 108 of the first part 102 of the coupling 100 to prevent the first part 102 of the coupling 100 from rotating and the extensions 40 of the third jaw 38 contact the yokes 118 of the second part 112 and rotate the second part 112. In the disconnect position, the pins 32 are positioned fully to one end of the slots 30 in the second jaw 28. In one (1) embodiment, the third jaw 38 is rotated less than 90°. Rotating the second part 112 misaligns the yokes 108 and 118 and flanges 110 and 120 of the first and second parts 102 and 112 of the coupling 100 by moving the yokes 118 of the second part 112 from connection with the flanges 110 of the first part 102 while simultaneously moving the yokes 108 of the first part 102 from over the flanges 120 of the second part 112. In the disconnect position, each of the extensions 20 of the first jaw 18 is adjacent one (1) of the extensions 40 of the third jaw 38. The pliers 12 can then be unlocked and moved to the open position to separate the first and second jaws 18 and 28 which allows for removal of the disconnected parts 102 and 112 of the coupling 100 from the tool 10.

To use the tool 10 of the first embodiment to connect a coupling 100, the pliers 12 are in the open position and the third jaw 38 is in the disconnect position. The second part 112 of the coupling 100 is positioned in the second and third jaws 28 and 38 with the extensions 40 of the third jaw 38 surrounding the yokes 118 of the second part 112. Next, the second end 104B of the body 104 of the first part 102 of the coupling 100 is positioned on the second end 114B of the body 114 of the second part 112 such that the center bore 104C of the first part 102 is aligned with the center bore 114C of the second part 112. Next, the first jaw 28 is positioned around the first part 102 and the pliers 12 are moved into the closed position and then locked. As the first and second parts 102 and 112 are moved together, the bushings 106 and 116 of the first and second parts 102 and 112 are compressed until the flanges 110 and 120 of one part 102 or 112 are aligned with the slots of the yokes 108 or 118 of the opposite part 112 or 102 such that the flanges 110 and 120 can be moved into the slots. Next, the third jaw 38 is rotated to align the yokes 108 and 118 and flanges 110 and 120 such that the yokes 118 of the second part 112 of the coupling 100 slide over the flanges 110 of the first part 102 of the coupling 100 and the yokes 108 of the first part 102 of the coupling 100 slide over the flanges 120 of the second part 112 of the coupling 100. The direction of rotation of the second part 112 depends on the position of the coupling 100 and the type of coupling. The pliers 12 are then unlocked and moved to the open position and the first and second jaws 18 and 28 are removed from around the first and second parts 102 and 112 of the coupling 100.

In the second embodiment, to disconnect one (1) of the coupling connections, the tool 210 is positioned adjacent the coupling point 154A to be disconnected such that the first jaw 228 is positioned between adjacent connection points 154B and 154C opposite the coupling point 154A to be disconnected and the second and third jaws 228 and 238 are adjacent the second part 162 of the coupling 150 (FIG. 9). In this embodiment, the body 154 of the first part 152 of the coupling 150 extends into the groove 218C in the first jaw 218. The inside surface of the groove 218C contacts the body 154 which allows the first jaw 218 to provide a force to the body 154 directly opposite the coupling point 154A. The contact of the first jaw 218 with the body 154 of the first part 152 of the coupling 150 also prevents the first part 152 of the coupling 150 from moving when the second part 162 of the coupling 150 is rotated to disconnect the coupling connection. The second and third jaws 228 and 238 are positioned around the second part 162 of the coupling 150 similar to the first embodiment. Once correctly positioned, the pliers 212 are moved into the closed position to move the first and second parts 152 and 162 of the coupling 150 together and compress the bushings 160. The coupling 150 is disconnected by rotating the third jaw 238 such that the third jaw 238 contacts the yokes 156 of the second part 162 to rotate the second part 162 about the longitudinal axis B—B to misalign the yokes 156 and flanges 158 of the first and second parts 152 and 162 of the coupling 150.

To connect a Y-shaped coupling 150, the second and third jaws 228 and 238 are positioned on the second part 162 of the coupling 150. The Y-shaped coupling 150 is positioned on the second part 162 such that the center bore of the second part 162 is aligned with the center bore 154D of the connection point 154A. The first jaw 218 is then positioned over the body 154 of the first part 152 and the pliers 212 are moved into the closed position and locked such that the first and second parts 152 and 162 of the coupling 150 are compressed together to align the flanges 158 with the slots in the yokes 156 of the coupling 150. The wrench 214 is then moved to rotate the third jaw 238 which rotates the second part 162 of the coupling 150 about the longitudinal axis B—B such that the flanges 158 are moved into the slots in the yokes 156 and the coupling 150 is in the connect position.

It is intended that the foregoing description be only illustrative of the present invention and that the present invention be limited only by the hereinafter appended claims.

We claim:

1. A tool for separating a first part of a pneumatic coupling from a second part of the pneumatic coupling, each of the first and second parts having a center bore which defines a longitudinal axis when the first and second parts are connected together, the tool which comprises:

a) a first member having a jaw end and a handle end;

b) a first jaw mounted on the jaw end of the first member and configured to engage the first part of the pneumatic coupling;

c) a second member having a jaw end and a handle end and pivotably connected to the first member to form pliers;

d) a second jaw mounted on the jaw end of the second member; and e) a third member having a handle end and a jaw end with a third jaw mounted on the jaw end and slidably connected to the second jaw for arcuate movement about the longitudinal axis, the third jaw configured to engage the second part of the pneumatic coupling and wherein, when the first member and the second member are moved into a closed position, the first and second parts of the coupling are moved toward each other and are connected or disconnected by rotation of the third jaw by the handle end of the third member.

2. The tool of claim 1 wherein the first part of the coupling includes a cylindrical body with yokes extending outward from the body spaced apart around a circumference of the body and wherein the first jaw has an arcuate opening configured to encircle the body of the first part and extensions spaced apart on the arcuate opening and configured to engage the yokes of the first part of the coupling.

3. The tool of claim 2 wherein the extensions have a arcuate inside surface and wherein each of the extensions extend around one of the yokes to position the first jaw on the first part of the coupling.

4. The tool of claim 1 wherein the second part of the coupling has a cylindrical body with yokes extending outward from the body spaced apart around a circumference of the body and wherein the second jaw has an arcuate opening configured to encircle the body of the second part of the coupling.

5. The tool of claim 1 wherein the second part of the coupling has a cylindrical body with yokes extending outward from the body spaced apart around a circumference of the body and wherein the third jaw has an arcuate opening configured to encircle the body of the second part and extensions spaced apart on the arcuate opening and configured to engage the yokes of the second part of the coupling.

6. The tool of claim 5 wherein the extensions of the third jaw have an arcuate inside surface and wherein each extension extends around one of the yokes of the second part of the coupling to position the third jaw on the second part of the coupling.

7. The tool of claim 1 wherein the first and second members are connected together to form locking-grip pliers.

8. The tool of claim 1 wherein the third jaw is slidably connected to the second jaw on a side adjacent the first jaw.

9. The tool of claim 1 wherein the second jaw has an arcuate opening, wherein the third jaw has an arcuate opening, wherein the arcuate opening of the second jaw is similar in size and curvature to the arcuate opening of the third jaw and wherein the third jaw is connected to the second jaw such that arcuate opening of the second jaw is aligned with the arcuate opening of the third jaw.

10. The tool of claim 1 wherein the first jaw has an arcuate opening with extensions spaced apart around the opening, wherein the third jaw has an arcuate opening with extensions spaced apart around the arcuate opening and wherein in a connect position, the third jaw is positioned such that each extension of the first jaw is spaced between each extension of the third jaw.

11. The tool of claim 10 wherein in a disconnect position, each extension of the third jaw is adjacent one of the extensions of the first jaw.

12. The tool of claim 1 wherein in the closed position, the first jaw is parallel to the second jaw.

13. The tool of claim 1 wherein the first part of coupling has a cylindrical body with opposed first and second ends with yokes mounted on an outer surf ace of the body, each yoke having a first end adjacent the first end of the body and a second end extending past the second end of the body in a direction opposite the first end of the body, wherein the first jaw has a arcuate opening with a curvature similar to a curvature of the outer surface of the body of the first part and a size greater than a diameter of the body of the first part and wherein the first jaw has extensions mounted adjacent the arcuate opening and extending outward from the first jaw, each extension having an inside surface with a shape similar to the shape of the first end of the yokes.

14. The tool of claim 13 wherein the first jaw has a first side and a second side, wherein the jaw end of the first member is mounted on the first side of the first jaw, wherein the extensions extend outward from the second side of the first jaw in a direction away from the first side and wherein in use, when the first and second members are moved to the closed position, the second side of the first jaw adjacent the inside surface of the extensions contacts the yokes of the first part of the coupling to apply a force to the first part of the coupling to move the first part of the coupling toward the second part of the coupling.

15. The tool of claim 1 wherein the second part of the coupling has a cylindrical body with opposed first and second ends with yokes mounted on an outer surface of the body, each yoke having a first end adjacent the first end of the body and a second end extending outward past the second end of the body in a direction opposite the first end of the body, wherein the second jaw has a first side and a second side, wherein the third jaw has a first side and a second side and is slidably mounted on the second side of the second jaw such that the first side of the third jaw is adjacent the second side of the second jaw, wherein the third jaw has extensions on the second side which extend outward in a direction away from the first side, wherein, when the first and second members are moved to the closed position, the second side of the third jaw adjacent the extensions contacts the yokes of the second part of the coupling such that a force is applied to the second part of the coupling to move the second part of the coupling toward the first part of the coupling.

16. The tool of claim 1, wherein the first part of the coupling is a Y-shaped coupling having three (3) connection points and wherein the first jaw has a groove configured to be positioned over the Y-shaped coupling between two (2) adjacent connection points and opposite a third connection point.

* * * * *